(12) United States Patent
Burke et al.

(10) Patent No.: US 9,045,232 B1
(45) Date of Patent: Jun. 2, 2015

(54) TRANSPORTABLE SYSTEM FOR SIMULATING FREE FALL IN AIR

(71) Applicants: Timothy A. Burke, Lancaster, CA (US); Matthew Allen Neal, Palmdale, CA (US); Arthur Richard Daniel Thompson, Lancaster, CA (US); Jonathan D. Wells, Lancaster, CA (US)

(72) Inventors: Timothy A. Burke, Lancaster, CA (US); Matthew Allen Neal, Palmdale, CA (US); Arthur Richard Daniel Thompson, Lancaster, CA (US); Jonathan D. Wells, Lancaster, CA (US)

( * ) Notice: Subject to any disclaimer, the term of this patent is extended or adjusted under 35 U.S.C. 154(b) by 257 days.

(21) Appl. No.: 13/815,661

(22) Filed: Mar. 14, 2013

(51) Int. Cl.
  *G09B 19/16* (2006.01)
  *B64D 23/00* (2006.01)

(52) U.S. Cl.
  CPC ...................................... *B64D 23/00* (2013.01)

(58) Field of Classification Search
  USPC .......... 434/29, 30, 48, 49, 53, 54, 59; 273/49, 273/130, 137; 472/49, 50, 134, 136, 137
  See application file for complete search history.

(56) References Cited

U.S. PATENT DOCUMENTS

| | | | |
|---|---|---|---|
| 3,435,671 A | 4/1969 | Hildt | |
| 3,484,953 A | 12/1969 | Norheim, Jr. | |
| 4,457,509 A * | 7/1984 | St-Germain | 472/136 |
| 4,578,037 A * | 3/1986 | Macangus et al. | 434/258 |
| 5,318,481 A | 6/1994 | St-Germain | |
| 5,365,782 A | 11/1994 | Bouis | |
| 5,501,101 A | 3/1996 | Purcell | |
| 5,593,352 A * | 1/1997 | Methfessel et al. | 472/50 |
| 5,655,909 A * | 8/1997 | Kitchen et al. | 434/44 |
| 5,753,811 A * | 5/1998 | Consolini | 73/147 |
| 5,866,813 A | 2/1999 | Nakaya | |
| 6,050,822 A | 4/2000 | Faughn | |
| 6,083,110 A * | 7/2000 | Kitchen et al. | 472/49 |
| 6,139,439 A * | 10/2000 | Ure | 472/136 |
| 6,315,672 B1 * | 11/2001 | Gillot et al. | 472/50 |
| 6,598,703 B1 | 7/2003 | Catalan | |
| 7,153,136 B2 * | 12/2006 | Hatlestad et al. | 434/59 |
| 7,156,744 B2 | 1/2007 | Metni | |
| 7,524,189 B2 * | 4/2009 | Delalande | 434/59 |
| 7,572,189 B2 | 8/2009 | Gentile | |
| 7,819,664 B2 * | 10/2010 | Petruk | 434/59 |
| 7,832,265 B1 | 11/2010 | Gong | |
| 8,668,497 B2 * | 3/2014 | Nebe et al. | 434/59 |
| 2009/0312111 A1 | 12/2009 | Gil | |

FOREIGN PATENT DOCUMENTS

JP     2001208643     3/2001

* cited by examiner

*Primary Examiner* — Kurt Fernstrom
(74) *Attorney, Agent, or Firm* — Dennis W. Beech

(57) ABSTRACT

A base structure of the system with a pair of center containers each of rectangular form with a square width and height and an elongated length attached along an elongated side of each. A side container may be attached to each side of the center containers. A semicircular shaped inlet port is formed in a top wall of each of the center containers to form a circular inlet port. A vertical duct of cylindrical form may be attached over the inlet port and have a lower portion of constant diameter cross-section and an upper portion diverging outwardly. A fan placed in each center container to cause an air flow toward a center of each center container to be channeled upwardly to exit through the inlet port for air to flow through the vertical duct to exit the open top end. A recirculating air structure may be formed with additional containers.

15 Claims, 5 Drawing Sheets

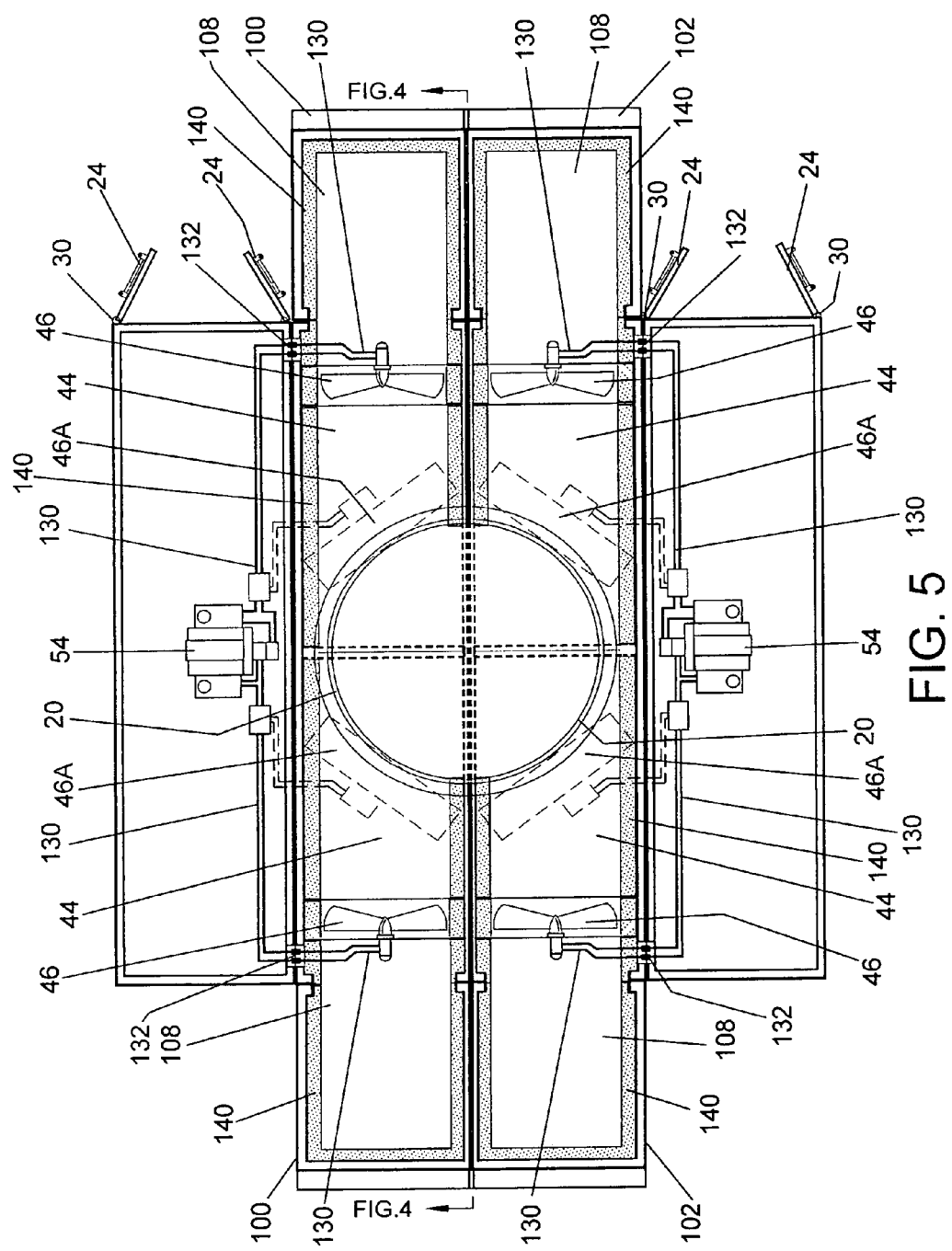

TRANSPORTABLE SYSTEM FOR SIMULATING FREE FALL IN AIR

BACKGROUND OF THE INVENTION

This invention relates to apparatus and system for simulating human or object free fall in air such as may be done in skydiving. The new system is a modular container package structure that has a base structure with apparatus to produce a current of air to flow upward through a vertical duct attached to the base structure at a velocity to approximate the terminal velocity of a person or object in free fall through still or ambient air. The field of the invention is also known as vertical wind tunnels.

Horizontal and vertical wind tunnels are known in the art for testing static devices and models as well as for simulating free fall in still or ambient air for purposes of training and entertainment of humans.

SUMMARY OF THE INVENTION

The present invention is directed to modular apparatus for simulating free fall in air comprising. A base structure may have a first center container and a second center container each of rectangular form with a general square width and height and an elongated length attached along an elongated side of each. A first side container may be attached to the first center container and a second side container may be attached to the second center container opposed to a center line of the attached elongated sides. A first inlet port of semicircular shape may be formed in a top wall of the first center container and a second inlet port of semicircular shape may be formed in a top wall of the second center container with the first inlet port and the second inlet port positioned to be adjacent along the attached elongated sides. A vertical duct of generally cylindrical form may be attached at an open bottom end over the first inlet port and the second inlet port wherein the vertical duct has a lower portion of generally constant diameter cross-section and an upper portion of a truncated inverted cone shape with an open top end. A fan with a connected power source may be positioned in each end of each of the first center container and the second center container to receive air from each end that is open to cause a current of air to flow toward a center of each of the first center container and the second center container to be channeled upwardly to exit through the first inlet port and the second inlet port for air to flow through the vertical duct to exit the open top end.

A circulating structure may have two pair of vertical containers attached at a lower end to each end of the center containers and a pair of elevated containers positioned and attached between the two pairs of vertical containers at an upper end. Each of the elevated containers may have an opening formed therein for engagement with the open top end of the vertical duct.

These and other features, aspects and advantages of the present invention will become better understood with reference to the following drawings, description and claims.

BRIEF DESCRIPTION OF THE DRAWINGS

FIG. 5 illustrates a top plan view of a base structure with the top walls of the containers removed and the circular base of a flight chamber outline indicated for a transportable system according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
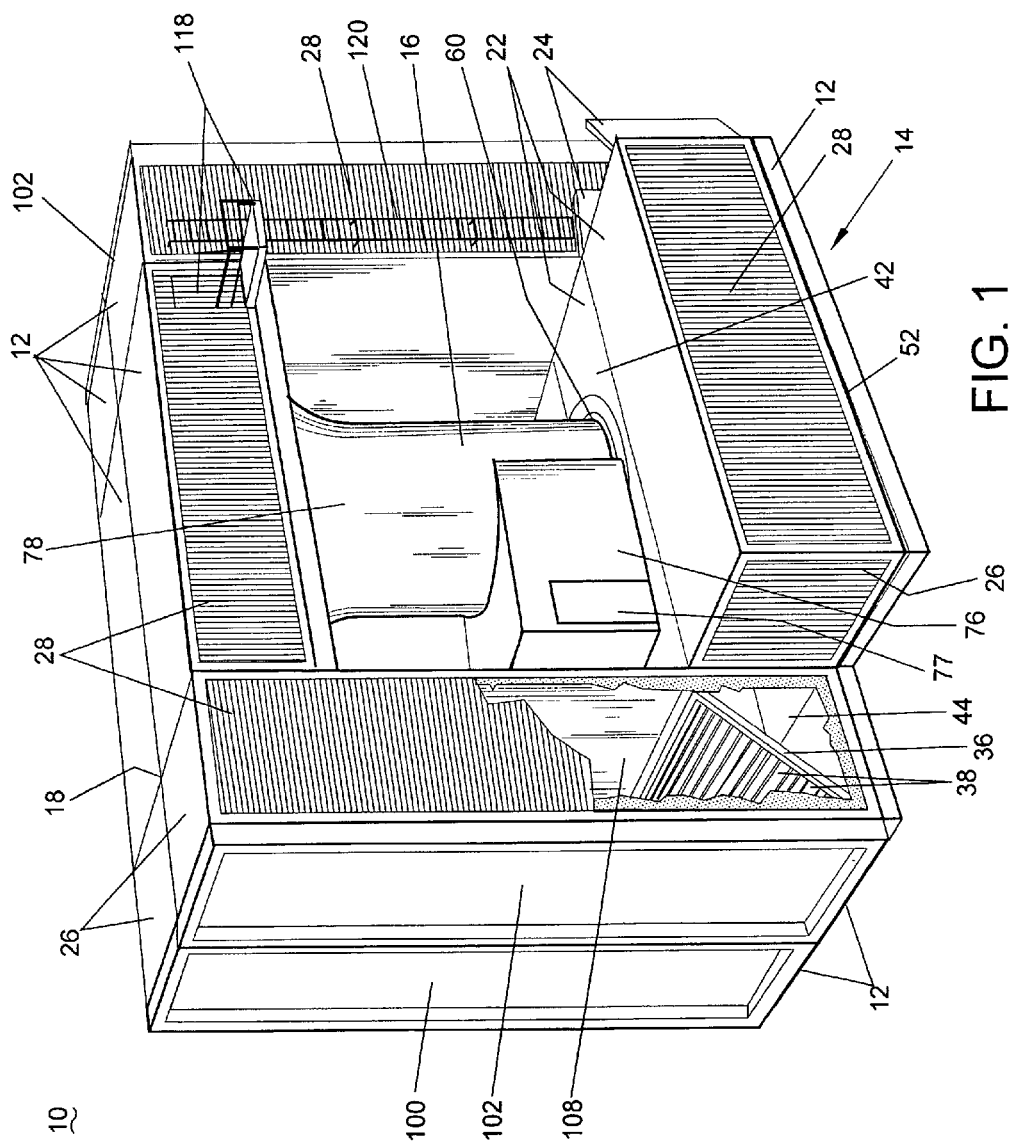
FIG. 1 illustrates a perspective elevation view of a transportable system according to an embodiment of the invention.
Figure 2:
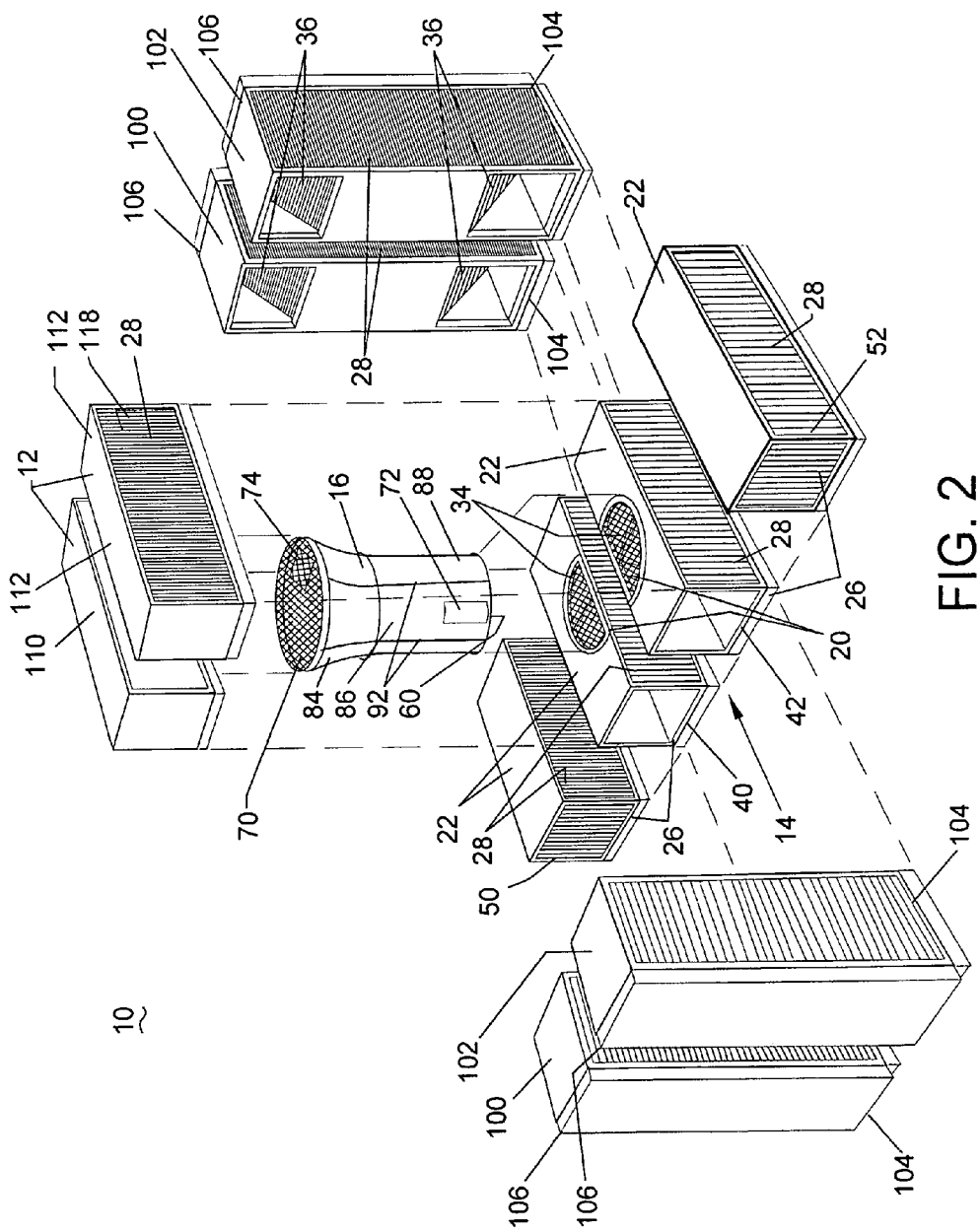
FIG. 2 illustrates an exploded elevation perspective view of a transportable system according to an embodiment of the invention.
Figure 3:
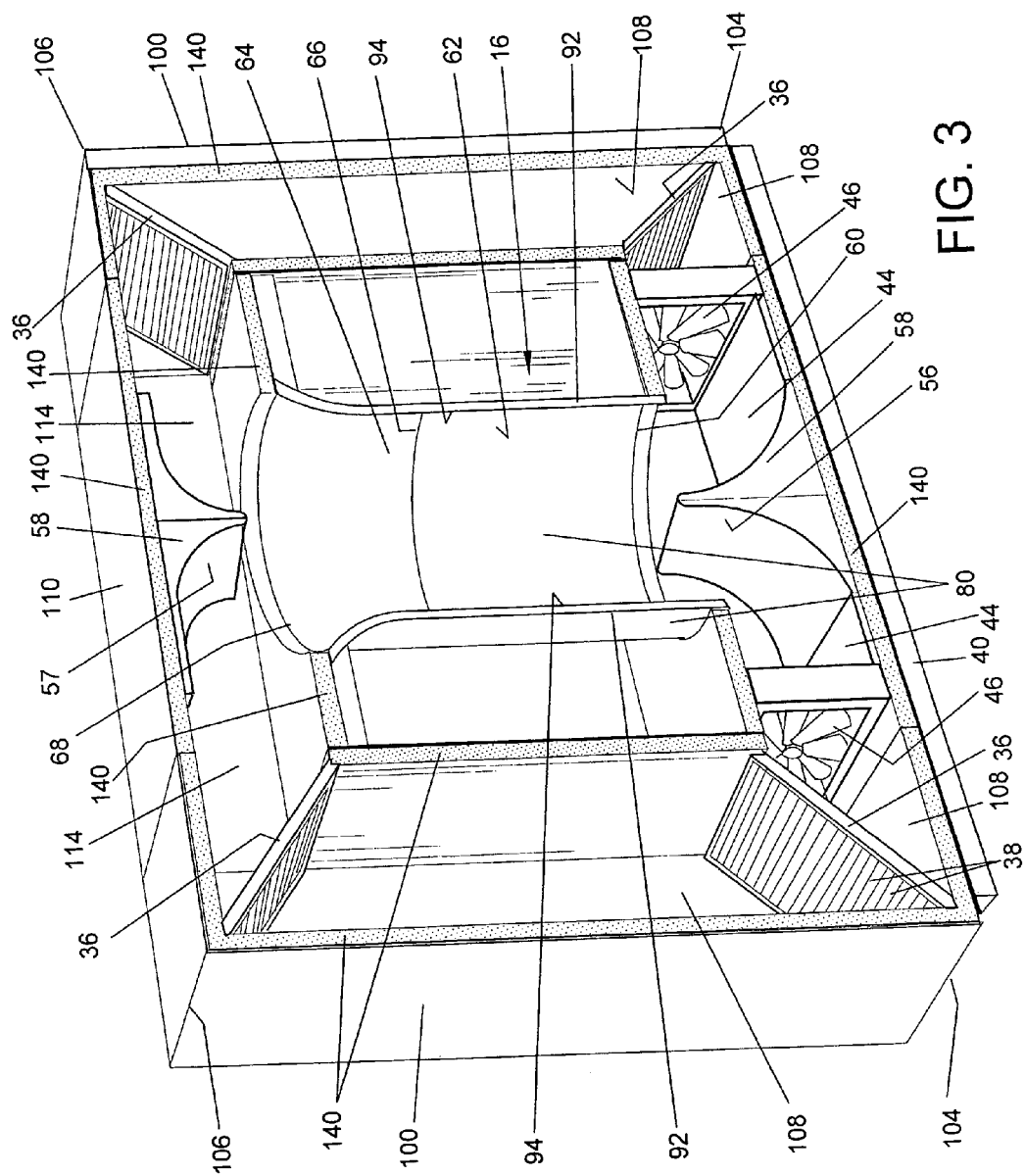
FIG. 3 illustrates a half cross-sectional perspective view of a transportable system according to an embodiment of the invention.
Figure 4:
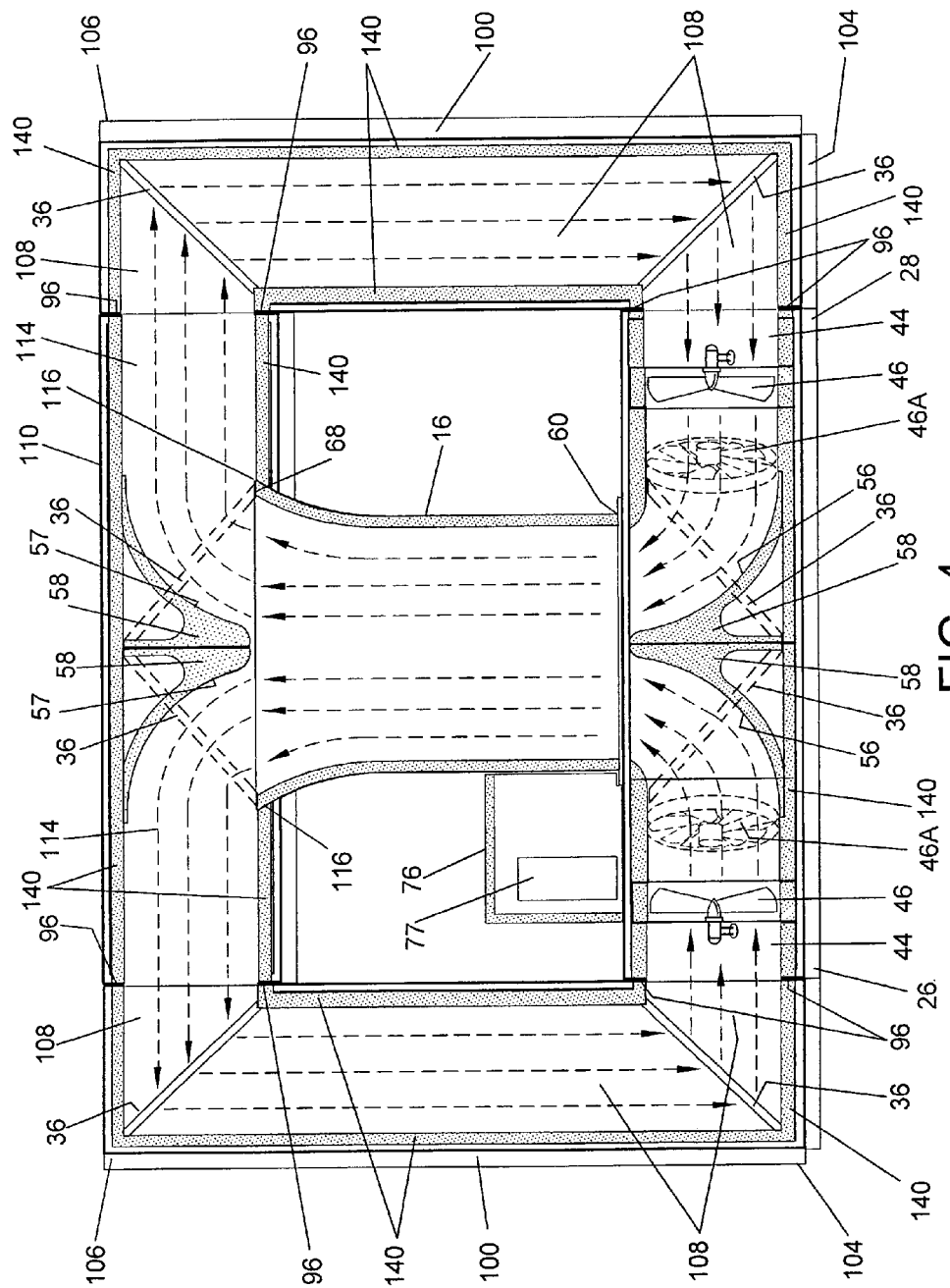
FIG. 4 illustrates a side elevation partially cutaway view of a transportable system according to an embodiment of the invention.

Referring to FIGS. 1 through 3, a transportable system 10 is a modular assembly of containers 12 arranged and attached to form a base structure 14 with an upstanding or vertical duct 16 or flight chamber attached over an inlet port 20 in the top wall 22 of the base structure 14. The transportable system 10 may also have a recirculating air structure 18 to receive air flow exiting an open top end 68 of the vertical duct 16 to return the air flow to the base structure 14 to produce air flow return to the inlet port 20 and vertical duct 16.

The base structure 14 may use shipping containers 12 that are rectangular metal structures that may be 40 feet long and 8 feet wide by 8 feet tall, and that may have doors 24 at one or both ends 26. The doors 24 may be hinged 30 at the vertical side walls 28 of the containers 12 as is well known in the shipping industry for shipping containers such as those of the International Organization for Standardization (ISO). The hinges 30 may be formed to allow removal of the doors 24 when they are opened such that one or more of containers 12 become open at each end 26 to form a long rectangular duct. The portion of the hinge 30 remaining attached to the vertical side walls 28 may be structured for use in attachment of one shipping container 12 to a second shipping container 12 depending on each containers 12 position in an assembled transportable system 10. Alternatively, the containers 12 may have flanges, brackets or the like attached at locations on each container 12 for use in assembly of a transportable system 10.

Referring to FIGS. 1 through 5, the base structure 14 may be an assembly of four containers 12 positioned side-by-side along their elongated or 40 foot axis as illustrated in FIGS. 1 and 2. The two center containers 40, 42 may have base air ducts 44 for receipt of air from each end 26 of the center containers 40, 42 to be acted on by a fan 46 positioned in each base air duct 44 to produce a current of air to be channeled upwardly downstream of the air flow from the fans 46 by upward slanted surfaces 56 or curved ducting 58 to channel the air flow to exit vertically through the inlet port 20 into the vertical duct 16. Fixed guide vanes 38 may be placed in the air flow to control air flow turbulence. The curved ducting 58 surfaces may be replaced with louvers 36 and guide vanes 38 similar to those illustrated in the Figures, see FIG. 5. Air seals 96 may be used between engagement surfaces of the containers 12 and the air ducts 44, 108, 114 as best viewed in FIGS. 4 and 5. The air seals 96 may be rubber, neoprene or other suitable flexible seal material.

The two side containers 50, 52 adjacent each of the center containers 40, 42 may have the power source 54 for operation of the four fans 46. The power source 54 may be electric or diesel motors and may be one or more motors with appropriate connecting power transfer between the power source 54 and the fans 46. Two electric motors with hydraulic power transfer are illustrated in FIG. 5. The fans 46 may be powered electrically, hydraulically, with combustion engines, electronic power grid or the like, and may be connected to the power source 54 by conductors or cables 130 connected between containers 12 by connectors 132. Excess space in the two side containers 50, 52 may be used for storage of material, maintenance facilities or other activities. An alternate positioning of the fans 46A and power source 54 is illustrated in FIG. 5 with the fans 46A positioned in a base air duct 44 adjacent the inlet port 20 at the bottom of the vertical duct 16.

For an installation of a transportable system 10 the base structure 14 may be assembled or erected on an open field, a concrete pad, a parking lot, a drop zone (military), in an aircraft hangar or large open building, or other generally flat, level space, by arranging the four base containers 40, 42, 50, 52 side by side and attaching them together. The base structure 14 may be attached or anchored to the assembly site for stability. The vertical duct 16 may then be assembled and attached at its open bottom end 60 in an upstanding position on the base structure 14. The inlet port 20 may have a grate 34 positioned to act as a barrier or guard to prevent users or objects from falling into the base air ducts 44.

The vertical duct 16 or flight chamber 16 may have a lower portion 62 that is generally cylindrical with a constant diameter cross-section shape, and an upper portion 64 that is in the form of an inverted, truncated cone to diverge outwardly from approximately 12 feet to 16 feet in an expanding cross-sectional diameter from a bottom end 66 to an open top end 68 to form a divergent diffuser portion of the vertical duct 16. The upper portion 64 wall may curve outwardly as it expands in cross-sectional diameter, see FIG. 3. This basic structure represents a static air system for simulating free fall in air in that static or ambient air can be drawn into the base air ducts 44 by the fans 46 to be accelerated into the vertical duct 16 to then be expelled out the open top end 68. A grate 70 or net-screen to prevent users from being expelled out of the open top end 68 even though the upper portion 64 diffuser of the vertical duct 16 should slow air flow velocity experienced by a user. There may be an access door 72 provided in the lower portion 62 of the vertical duct 16 to allow a user to enter the duct 16 and to stand on the grate 34. There may be an access door 74 in the grate 70 to allow a user to enter the vertical duct 16 at the open top end 68 with for example air flow in the duct to simulate jumping at an elevated location into air. An anteroom 76 with an entry door 77 may be positioned on the top wall 22 of the base structure 14 to abut the lower portion 62 of the vertical duct 16 with the anteroom 76 connected or in communication with the access door 72. This may allow persons to be positioned in a room for pressure equalization with the pressure in the vertical duct 16 prior to entry through access door 72.

For ease of transport, assembly and disassembly the vertical duct 16 that may be generally cylindrical shape may be formed of two half cylinder walls 80, 82 or four quarter cylinder walls 84, 86, 88, 90 with flanges 92 or brackets along the elongated edges 94 for use in attaching the elements of the wall 78 together.

To allow recirculation of air flow in a transportable system 10, two vertical containers 100, 102 may be attached at a first end 104 to open ends 26 of the two center containers 40, 42 and two elevated containers 110, 112 may be attached at a second end 106 of the vertical containers 100, 102 to span across the open top end 68 of the vertical duct 16. The vertical containers 100, 102 may have vertical end ducts 108 that connect at a first end 104 to the base air ducts 44 and at a second end 106 to cross-member air ducts 114 in the elevated containers 110, 112. The cross-member air ducts 114 have an opening 116 to receive expelled air from the open top end 68 of the vertical duct 16. Louvers 36 with guide vanes 38 may be positioned at corners or ends of the two vertical containers 100, 102 in the air flow of ducts 108 to control air flow turbulence. There may be downward slanted surfaces 57 on curved ducts 58 centered in the air ducts 114 of the elevated containers 110, 112, as best viewed in FIGS. 3 and 4, to control air flow out of the vertical duct 16. The air ducts 44, 108, 114 may be tubular with circular, rectangular or other cross-section shaped. There may be insulation 140 such as Styrofoam or foam material between the walls of the containers 12 and the air ducts 44, 108, 114 to provide a noise dampener as well as insulation from the outside heat or cold. The insulation should allow the air to remain more stable in temperature.

Access devices for users may be attached to the transportable system 10 as for example, a vertical ladder 120 attached on the vertical side wall 28 of a vertical container 100, 102 for access to an upper door 118 with a platform in the vertical side wall 28 of an elevated container 110, 112 for access to the access door 74 in the grate 70 at the top of the vertical duct 16. The ducting and air flow power elements such as fans and motors may be sized to cause vertical duct 16 or flight chamber conditions for air velocity of at least 150 mph up to 220 mph or 3 million cubic feet per minute or greater to simulate high velocity free fall air conditions. A vertical duct 16 diameter of approximately 12 feet in the lower portion 16 can be used to produce such conditions using commercial standard fans and motors.

While the invention has been particularly shown and described with respect to the illustrated embodiments thereof, it will be understood by those skilled in the art that the foregoing and other changes in form and details may be made therein without departing from the spirit and scope of the invention.

We claim:

1. A modular apparatus for simulating free fall in air comprising:
   a base structure that has a first center container and a second center container each of rectangular form with a general square width and height and an elongated length attached along an elongated side of each;
   a first side container attached to said first center container and a second side container attached to said second center container opposed to a center line of said attached elongated sides;
   a first inlet port of semicircular shape formed in a top wall of said first center container and a second inlet port of semicircular shape formed in a top wall of said second center container with said first inlet port and said second inlet port positioned to be adjacent along said attached elongated sides;
   a vertical duct of generally cylindrical form attached at an open bottom end over said first inlet port and said second inlet port wherein said vertical duct has a generally constant diameter cross-section with an open top end; and
   a fan with a connected power source positioned in each end of each of said first center container and said second center container to receive air from said each end that is open to cause a current of air to flow toward a center of each of said first center container and said second center container to be channeled upwardly to exit through said first inlet port and said second inlet port for air to flow through said vertical duct to exit said open top end.

2. The modular apparatus as in claim 1 wherein each of said first center container, said second center container, said first side container and said second side container has width of approximately 8 feet, a height of approximately 8 feet and a length of approximately 40 feet.

3. The modular apparatus as in claim 1 wherein each of said connected power sources is positioned in one of said first side container and said second side container.

4. The modular apparatus as in claim 1 wherein said vertical duct is comprised of two generally semicircular half wall members with a flange along each vertical wall edge.

5. The modular apparatus as in claim 1 wherein said vertical duct in said lower portion has an approximate diameter of 12 feet.

6. The modular apparatus as in claim 1 wherein an access door is disposed in said lower portion.

7. The modular apparatus as in claim 6 wherein an anteroom with an entry door is disposed on the top wall abutting the lower portion of the vertical duct and is connected to the access door.

8. The modular apparatus as in claim 1 wherein a grate is attached over said first inlet port and said second inlet port.

9. The modular apparatus as in claim 1 wherein said first center container, said second center container, said first side container and said second side container are International Organization for Standardization 40 foot container.

10. The modular apparatus as in claim 9 wherein each door of each of said 40 foot containers has hinged removable doors.

11. The modular apparatus as in claim 1 wherein said first center container and said second center container each have a base air duct interior at each end with each of said fans disposed in each of said base air ducts.

12. The modular apparatus as in claim 1 wherein said vertical duct has a lower portion of generally constant diameter cross-section and an upper portion of a truncated inverted cone shape with said open top end.

13. The modular apparatus as in claim 12 wherein said vertical duct truncated cone shape of said upper portion diverges outwardly from approximately 12 feet to 16 feet in an expanding cross-sectional diameter.

14. The modular apparatus as in claim 1 further comprising:
 a circulating structure that has first vertical container attached at a first end to a first end of said first center container and a second vertical container attached at a first end to a second end of said first center container;
 a third vertical container attached to said first vertical container and attached at a first end to a first end of said second center container, and a fourth vertical container attached to said second vertical container and attached at a first end to a second end of said second center container; and
 a first elevated container disposed and attached between said first vertical container at a second end and said third vertical container at a second end, and a second elevated container attached to said first elevated container disposed and attached between said second vertical container at a second end and said fourth vertical container at a second end, wherein each of said first elevated container and said second elevated container has an aperture disposed therein for engagement with said open top end of said vertical duct.

15. The modular apparatus as in claim 14 wherein:
 each of said first, second, third and fourth vertical containers has an air duct in communication with one of said base air ducts; and
 each of said first and second elevated containers has a cross-member air duct in communication with one of said air ducts.

\* \* \* \* \*